United States Patent
Leow

(10) Patent No.: US 10,887,560 B2
(45) Date of Patent: Jan. 5, 2021

(54) METHOD AND APPARATUS FOR USINIG THERMAL DATA TO TRIGGER IDENTIFICATION PROCESS

(71) Applicant: Meridian Innovation, Inc., Milpitas, CA (US)

(72) Inventor: Chon Hock Leow, Menlo Park, CA (US)

(73) Assignee: Meridian Innovation, Inc., Milpitas, CA (US)

(*) Notice: Subject to any disclaimer, the term of this patent is extended or adjusted under 35 U.S.C. 154(b) by 0 days.

(21) Appl. No.: 16/283,759

(22) Filed: Feb. 23, 2019

(65) Prior Publication Data

US 2019/0268575 A1 Aug. 29, 2019

Related U.S. Application Data

(60) Provisional application No. 62/634,830, filed on Feb. 24, 2018.

(51) Int. Cl.

| H04N 7/00 | (2011.01) |
|---|---|
| H04N 7/18 | (2006.01) |
| G06K 9/00 | (2006.01) |
| H04N 5/232 | (2006.01) |
| H04N 5/225 | (2006.01) |
| H04N 5/33 | (2006.01) |

(52) U.S. Cl.
CPC ......... *H04N 7/185* (2013.01); *G06K 9/00536* (2013.01); *H04N 5/2258* (2013.01); *H04N 5/232411* (2018.08); *H04N 5/33* (2013.01); *H04N 7/188* (2013.01)

(58) Field of Classification Search
CPC ............. H04N 7/185; H04N 5/232411; H04N 5/2258; H04N 5/33; H04N 7/188; G06K 9/00536
See application file for complete search history.

(56) References Cited

U.S. PATENT DOCUMENTS

| 2014/0203629 | A1* | 7/2014 | Hoffman | G01J 5/0022 307/9.1 |
| 2014/0320666 | A1* | 10/2014 | Badawy | H04N 7/18 348/169 |

(Continued)

FOREIGN PATENT DOCUMENTS

| WO | WO-2017090034 A1 * | 6/2017 | H04N 5/23241 |

*Primary Examiner* — Zhihan Zhou
(74) *Attorney, Agent, or Firm* — Law Office of John Merchant

(57) ABSTRACT

A security system and method for collecting and analyzing thermal data to save power and identify persons. The security system includes a processor with connected processor and one or more additional devices such as an alarm, lighting device or visual light camera. When the security system is in a low power sleep mode, the thermal sensor detects and collects thermal data from a thermal object body and the processor determines if the collected thermal data matches predefined parameters for a thermal body and then activates any one of one or more of the connected additional devices based on the match. The system is then operational to collect visual data and process the collected thermal and visual data to match against stored profiles. The thermal data may be collected at low or no light conditions to determine the need to power up the system to collect visual data.

8 Claims, 7 Drawing Sheets

(56) References Cited

U.S. PATENT DOCUMENTS

| | | | |
|---|---|---|---|
| 2015/0009140 A1* | 1/2015 | Chia | G06F 3/0317 |
| | | | 345/158 |
| 2015/0323200 A1* | 11/2015 | Gluck | F24D 19/1003 |
| | | | 237/9 R |
| 2016/0180078 A1* | 6/2016 | Chhabra | G06F 21/31 |
| | | | 726/19 |
| 2018/0268673 A1* | 9/2018 | Amir | G08B 13/1961 |

* cited by examiner

METHOD AND APPARATUS FOR USINIG THERMAL DATA TO TRIGGER IDENTIFICATION PROCESS

CROSS-REFERENCE TO RELATED DOCUMENTS

The present invention claims priority to a U.S. provisional patent application Ser. No. 62/634,830 entitled Method and Apparatus for Identifying and Authenticating Identify of User filed on Feb. 24, 2018 disclosure of which is included herein at least by reference.

BACKGROUND OF THE INVENTION

1. Field of the Invention

The present invention pertains particularly to methods and apparatus for using on or more thermal sensors as a trigger to either start an electronic authentication or verification process, improve systems including visual light sensors or otherwise enable power savings in such systems that would otherwise rely on motion sensors to detect the presence and location of a subject to illuminate and/or authenticate.

2. Discussion of the State of the Art

In the field of photography or digital security, sensors such as visible spectrum sensors have been provided to mobile computing and communications appliances or devices, such as mobile phones, laptop computers, tablet computers, and similar appliance or devices for identifying and authenticating users and other persons as well as to illuminate secure areas or take photographs. In this type of authentication procedure, a still image or video is captured of the user with a visible spectrum sensor. In the security and authentication context, the image(s) are analyzed by one or more facial recognition algorithms to match to a user's previously submitted image and thus identify and authenticate the user for such as log in, verification, and completion of a transaction through a mobile phone, a laptop or, a tablet and a network node or server. A number of these systems require the visible light sensor to be powered on at all times or otherwise rely on motion sensors to determine the presence and location of a subject to illuminate, authenticate, and/or identify.

One challenge with systems relying on visible spectrum facial recognition algorithms alone is that they can be defeated or fooled into to authenticating an image or video which is not of the intended user, for example by a still image or video supplied by a mobile device such as a mobile phone, laptop or tablet. If a still image can be reproduced with enough fidelity and introduced to the system as the user to be authenticated, the system may mistake that still image or video as being the user. In the case of video, the recognition algorithm may be fooled by a video of the target displayed on an LCD. Another challenge exists if the system relying on visible spectrum has to be powered on at all times in order to detect the user. A system running sensors powered on for visible spectrum can waste significant energy when there is no user to detect. In systems utilizing motion sensors to detect the presence and relative location of an object body or individual to identify, false alarms are easily triggered by other environmental causes of motion.

Still another challenge exists if the ambient environment around a user requesting authentication using a system relying on visible spectrum facial recognition is dark such that the capture features of the user's face may lead to false positives or true negatives leading the system software to reject authentication and thus frustrate the user attempting to obtain authentication.

Therefore, what is clearly needed is a method and apparatus for identifying and authenticating a user by augmenting data using at least two disparate sensors. Because sensor power consumption can be high, it is preferable that there be a primary step to determining whether a sensor reading is necessary before powering up the system.

SUMMARY OF INVENTION

The present invention is a security system and method for collecting and analyzing thermal data to save power and identify persons.

The security system comprises a processor, thermal image sensor connected to the processor, and one or more devices enabled to communicate with the processor. When the security system is in a low power sleep mode, the thermal sensor detects and collects thermal data from a thermal object body and the processor determines if the collected thermal data matches predefined parameters for a thermal body (such as a person) and the processor then activates any one of one or more first external devices based on the match. In one embodiment of the system, the thermal image sensor is operating in a low or no light environment. In another embodiment, the one or more first devices may be any one of a sound alarm, silent alarm or lighting device enabled to illuminate a specific detection range of the thermal sensor. In another embodiment, the one or more first devices is a visual light camera connected to the processor, the visual light camera being enabled to capture visual image data. In another embodiment, the thermal image sensor and visual light camera may have a predetermined detection range to ensure that the subject is within reasonable proximity to the camera to take an accurate thermal or visual image, for example between 1 foot to 10 meters.

In some embodiments of the system, when the collected thermal data is determined to be within a predefined thermal range consistent with a person, an image is captured by the visual light camera and the visual image data is sent to a data store with the thermal data. The data store is accessible by the processor enabled to authenticate an identity of the person. In some embodiments, the image profiles are associated with specific identities and stored in the data store, and the thermal data and image data are integrated and used to match to one of the image profiles thereby making an identification. Upon making the identification, the processor may cause a second device to activate. The second device may be a locking device or some other device associated with guarding an entrance or other secured area or device. A computerized device connected to the processor and data store may, in some embodiments, execute software to process the thermal and visual image data, match the processed data to one of the stored image profiles, and makes an identification.

The method for implementing the security system in a low power sleep mode, comprises the steps of positioning the system having a predetermined operational range and in a state of low power sleep mode, connecting a processor and data store to a thermal image sensor, detecting and collecting thermal data from a thermal object body in the predetermined operational range, determining, by the thermal sensor, if the thermal data matches predefined parameters for a thermal body, and if the determination is that the thermal data matches predefined parameters, activating one or more first devices enabled to communicate with the processor. In one embodiment of the method, the security system is operating in a low or no light environment. In another embodiment, the one or more first devices may be any one of a sound alarm, silent alarm or lighting device enabled to illuminate a specific detection range of the thermal sensor. In another embodiment, the one or more first devices is a visual light camera connected to the processor with the visual light camera activated and enabled to capture image data. In another embodiment, a predetermined operational rage is defined to ensure that the data subject is within reasonable proximity to ensure accuracy of the collected data, for example between 1 foot to 10 meters.

In some embodiments of the method, the thermal data is within a predefined thermal range consistent with a person, an image is captured by the visual light camera and the visual image data is sent to the data store with the thermal data. The data store is accessible by the processor enabled to authenticate an identity of the person being identified. In one embodiment, the image profiles are associated with specific identities of persons and stored in the data store, and the thermal data and image data are integrated and used to match to one of the image profiles, thereby making an identification. In another embodiment, the processor, upon making the identification, causes a second device to activate. In one embodiment, the second device may be a locking device or a device utilized to guard a secured area. In another embodiment, a computerized device connected to the processor and data store, executes software to process the thermal and visual image data to match the processed data to one of the stored image profiles and makes the identification.

DETAILED DESCRIPTION OF THE INVENTION

In various embodiments described in enabling detail herein, the inventor provides a unique power saving system for identifying a user and or authenticating the actions of a user by collecting thermal and visual data collected from one or more sensors. It also describes a multistep process for first using a thermal sensor to determine whether it is necessary (or advantageous) to power up the system to illuminate the subject or otherwise take a visible spectrum photo or video. In some embodiments, the thermal sensor is utilized to determine the range of a subject thermal body relative to the visible light sensor. In some embodiments additional thermal information is utilized to determine size, identity, or orientation of the thermal body before powering up the visible light capability or otherwise powering up the system to perform other tasks such as ring an alarm, open a lock, turn on a light or send information via network to third parties. In some embodiments, thermal and/or visible light data is processed locally. In other embodiments, thermal and/or visible light data is processed at a remote server or other computerized device in communication with the system by network. The present invention is described using the following examples, which may describe more than one relevant embodiment falling within the scope of the invention.

Figure 1:
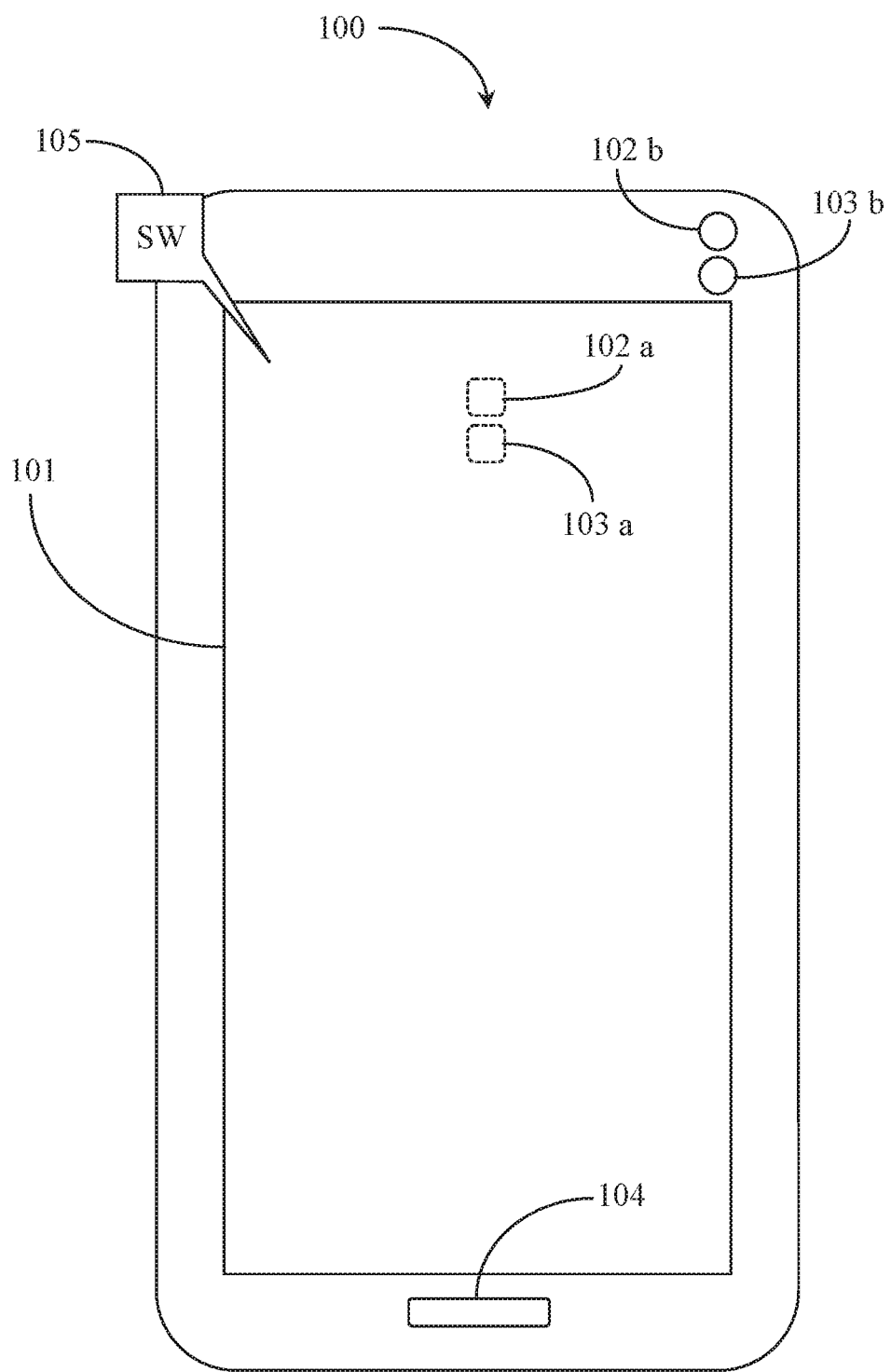
FIG. 1 is a front elevation view of a smart phone 100 having visual and thermal imaging capability according to an embodiment of the invention.

FIG. 1 is a front elevation view of a smart phone 100 having visual and thermal imaging capability according to an embodiment of the invention. Smart phone 100 is a computing device capable of accessing a data network and of being used to perform purchases over a network and of gaining access to secure websites using one or more authentication mechanisms. FIG. 1 shows both front and back positions of thermal and visible light sensors. The positioning of the sensors relative to one another may be changed without departing from the scope and spirit of the invention.

Smart phone 100 includes a touch screen display 101 that takes up most of the footprint of the front face of the phone. Smart phone 100 includes a video and still image camera having a first focal viewpoint from lens 102a located on the back side of the phone with a viewing field extending behind the phone and therefore in rough alignment with the user's focal perspective. The video and still image camera includes a second focal viewpoint from lens 102b strategically located on the front face plate of smart phone 100 above the touch screen and near the right edge of the device. A user operating a camera SW application 105 may activate the video/still camera to take visible light (VL) spectrum video or still images of subjects within a viewing field of lens 102a, or from the viewing field of lens 102b by "swapping" the viewpoints using an associated SW application on the smart phone. The camera resolution may be between 1 mega pixels and 8 mega pixels.

Smart phone 100 is also equipped with a thermal imaging sensor and supporting circuitry adapted to detect a generated heat while operating in a sleep mode and adapted to capture thermal still images or video. The thermal imaging sensor may be a long wave infrared (LWIR) sensor. The resolution of the thermal imaging device may be approximately 32×32 for example. The resolution may be higher depending on the field of view and distance of the area being monitored. Like the visual spectrum imaging device, the thermal sensor has two thermal lens focal points 103a on the rear of the phone and 103b on the front of the smart phone just below the visual imaging devices front focal lens 102b. The inventor chooses to depict separate focal points for the camera device, one visual and one thermal, to clearly illustrate the separation of the two imaging technologies. In one embodiment, a single combined focal point may be provided wherein the visible light imaging and thermal imaging components are integrated into a single device and located such that each component provides generally the same view angle, however the visible light and thermal sensors can be independent and located in different positions without departing from the spirit and scope of the present invention.

Smart phone 100 includes a software (SW) application 105. SW 105 is adapted as an interface between a user and the camera device or devices. SW 105 may provide specific settings and options for a user that may record a visible light/thermal image or video for a dual mode authentication process. In one implementation, SW 105 includes a data manager component that may combine data from the visible light imagery and from the thermal imagery to present a high granularity image that may identify the user by visual recognition of the user's facial features and by thermal signature of the user's facial regions, more particularly regions involved with breathing such as the nose and mouth. For example, the visible light sensor may be used to detect the blinking of an eye and the thermal sensor may be used to detect breathing of the subject by monitoring variations of temperature at the nostril. The SW may process the data to provide a visible light and/or thermal signature of the subject which indicates whether the subject user is alive and, to some extent, the subject's physical or (by implication of the physical features—thermal facial data, rapidity of breath, heart rate) the mental state of the subject.

The recorded data may be processed on smart phone 100 with the aid of SW 105 to produce a set of data that may be submitted from the smart phone over a network to a remote interface for the purpose of authenticating the user for a secure log-in procedure or to confirm or authorize a transaction over the network. Data recorded may be compared with data held at the remote interface for log-in procedures. For transactions, the data recorded may be received at the remote interface and then used to gain authentication from a third-party entity such as a credit card company, which would have the data on file for comparison, in this case to confirm the user is the owner of the credit card being used in a transaction.

In an alternative embodiment of the system, the smart phone 100 could be replaced by a sensors at a static location such as a point of entry at a building or at a check out terminal at a department store and connected with a local processor having access to local memory and SW loaded thereon. For example, a single visible light sensor (such as a video camera) and a thermal sensor may be connected to a computerized device such as a check out terminal or personal computer connected with a network. The field of view of these sensors may be static or adjustable (manually or automatically). In such embodiment the thermal and visible light sensors may be independent of each other and connected to a processor having memory and SW. In such embodiment the thermal and visible light sensors may be in different locations providing different fields of view/detection. The data collected by each sensor may be processed by an instance of SW recorded in local memory using a processor and the collected data may be processed locally prior to being sent over the network. In some such embodiments, there may be authentication data stored locally on the system and there is no need for the system to communicate on a network with a server. In other words, the data collected by the sensors may be processed and matched with authentication data stored in local memory rather than on a remote server.

Figure 2:
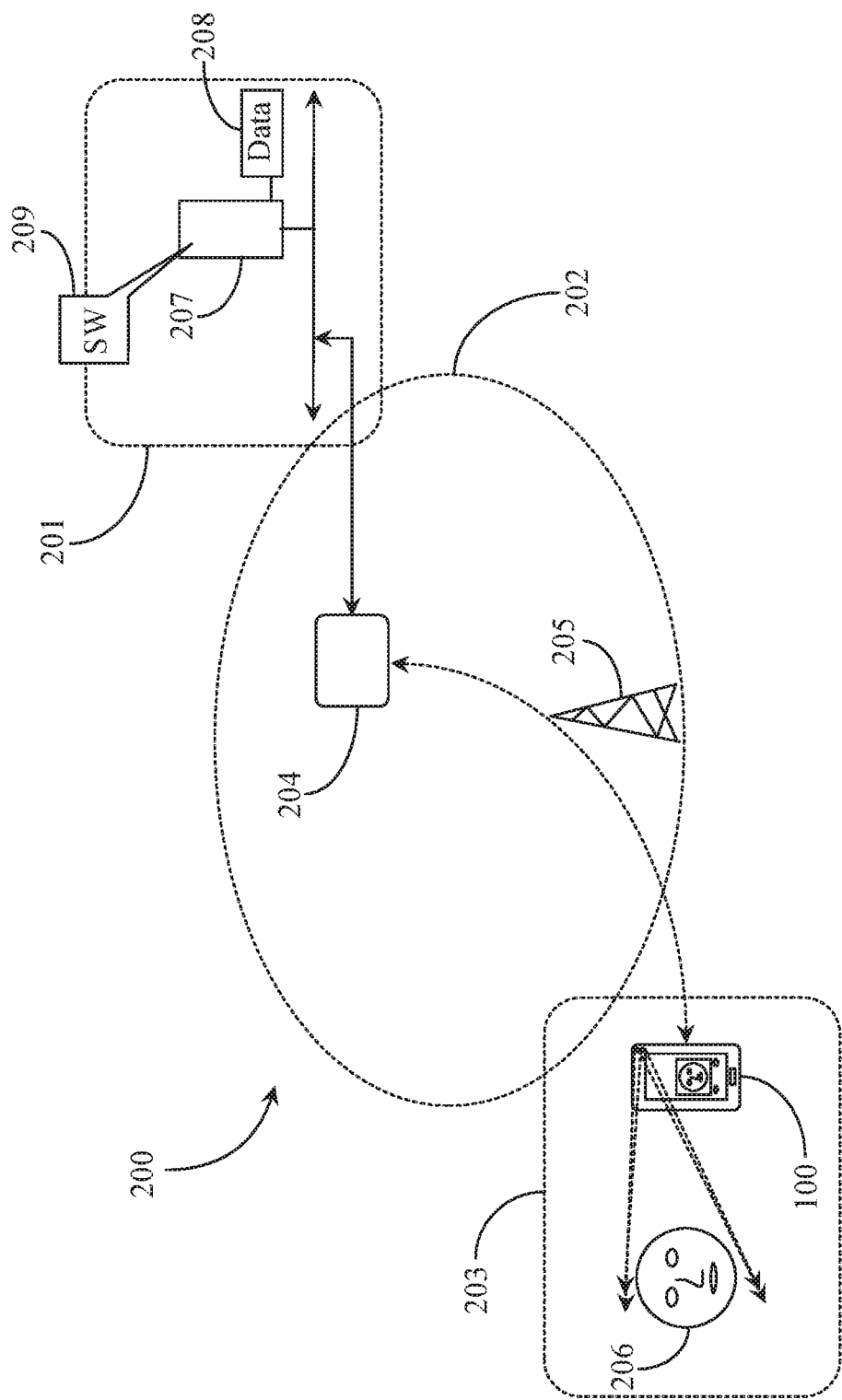
FIG. 2 is an architectural overview of a communications network supporting dual mode identity recognition and authentication.

FIG. 2 is an architectural overview of a communications network supporting dual-mode identity recognition and authentication. Communications network 200 includes an Internet network 201 exemplified herein by a double arrow backbone and a broken boundary indicating domain. Internet 201 includes an Internet server 207 connected to a data repository 208 labeled data. Server 207 may represent any remote interface that might be accessible to a user for performing a log-in procedure. In the same embodiment, server 207 may be a third-party server to a remote interface wherein that server belongs to a financial lending institution or an entity responsible for confirming identity of a user in the process of transacting through the remote interface. In one embodiment, a user will record an image, display the image on the smart phone and submit the image through an optical scanner; the thermal data preserved or embedded within the image data.

Data repository 208 is adapted to contain client data including profile data about the client, password data, personal information number (PIN) data, account status data, and secure and encrypted visual face and thermal identification data that is taken from the client and preloaded into the client sector database for comparison whenever the user requests a log-in page and submits data including the image data or is conducting a transaction and the data is submitted to a financial institution for verification.

Communications network 200 includes a data carrier network 202 such as a digital cellular network, a Wi-Fi network, or another sub-network to Internet network 201 that a user operating a smart phone such as smart phone 100 may access. Network 202 includes at least one gateway 204 onto the Internet network and at least one cell tower 205 to relay cell signals from a user connecting to the Internet. A user location 203 represents any location from which a user, depicted herein as a user 206 operating phone 100, may be attempting to connect to the Internet and perform a transaction or secure log-in procedure, or conducting a transaction through a store terminal and scanner.

In general use, user 206 may record a short video or one or a set of still images recording both visual light and thermal heat data showing the face of the user. The image or video may display on the smart phone screen. User 206 may upload the image or video through carrier network 202 and gateway 204 to server 207 running software (SW) 209. SW 209 may be adapted to use the uploaded data to match to the user's data held on file. In one embodiment, SW 209 continues to update a user's signature imagery that is held in repository 208. In this way the data is the most current data matching the user in current time.

Server 207 may authenticate user 206 and provide access to a website or service the user is accessing or provide identification and authentication confirmation to the user. If the user is accessing through a physical retail terminal, then the confirmation or rejection may be displayed at the terminal but not to the user. This may be a case where the user scans the image into the terminal or transfers it wirelessly to the terminal via swipe or near field wireless connection.

In this example, the user is being identified and authenticated on a network, so the user may engage in a transaction, interact on a subscribed website, or otherwise be approved to operate based on the latest confirmed data that the user supplied to the site charged (or responsible) with determining whether the user is legitimate (i.e. not a robot or an image intended to dupe the system into authenticating a non-authorized person) and whether the user is the owner of the dual-sensor-collected data. In some other embodiments, the user may be identified and authenticated locally, for example, by a security entry system, or simply to authenticate to unlock (or otherwise provide access to) an electronically secured computing device the user owns or has access to and authority to unlock. In an alternative embodiment, the authentication can be split into local authorization and/or remote authorization depending on the components of the local system, power needs of the local system, and the responsiveness (for example, speed and bandwidth) of the network. For example, a determination that the collected thermal data is consistent with a live human being made be made locally and the visible light still image or video image data may be processed locally and sent by network to be matched with authentication data stored at a remote server. If there is not enough power available at the local system to process the date, that function may be performed at a remote server. In some embodiments, the system may be configured so that visible light images or video data is not collected unless or until there is a determination by the system that the collected thermal data is consistent with a live person having certain physical characteristics (such as size) or is otherwise positioned close enough to the visible light sensor (camera or video) to take an accurate reading and/or otherwise oriented towards or otherwise facing the visible light camera. In other words, thermal reading determines whether and, in some instances, when the visible data is collected. In some embodiments of the system, there is no visible light sensor data taken—the visible light sensor is replaced by an illumination device (a visible spectrum light for example) which is turned on when the thermal sensor determines there is a person within certain proximity. In such example, the thermal sensor reading is used to determine whether it is advantageous to expend power to perform tasks other than taking a visible light image or other data.

Figure 3:
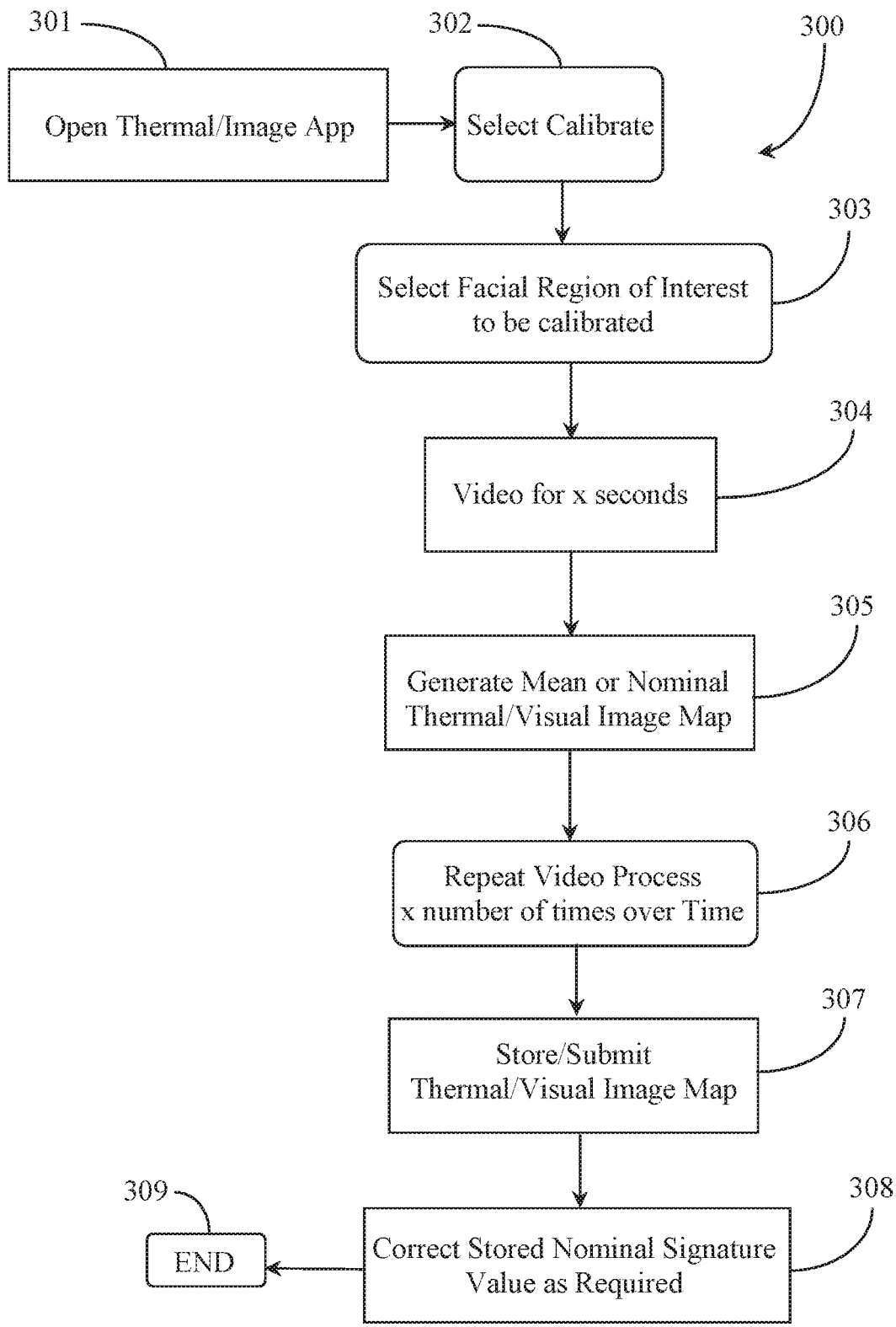
FIG. 3 is a process flow chart depicting steps of capturing a thermal image of a person or user to be identified or authenticated.

FIG. 3 is a process flow chart depicting steps for generating a thermal signature of a user. For purposes of discussion, a thermal signature includes data capable of at least creating a thermal image. In other words, a thermal image or video can be a type of thermal signature. In some examples, the thermal signature may be a processed thermal signature such as an average or determination of relationships between certain temperature data within a thermal image. At step 301, a user may execute to open a downloaded thermal/image application on a host device such as a smart phone. At step 302, the user may select "collect thermal data" from a settings list of options and or preferences. In one aspect, the user may select a specific facial region of interest to be the focus of collection at step 303. For example, the user may prefer to create his or her thermal signature using the nose region but not the mouth region. In one aspect, the user may select to include both the mouth and nose regions. In still another aspect there may not be a selective option and the thermal data recorded would be of the entire face of the user including the nose and the mouth regions and, in some cases, the eye regions.

At step 304, the user may be asked or otherwise prompted or instructed to record a thermal video of his or her face for a specified amount of time such as a number (x) of seconds. It may be more efficient to collect and record thermal data using video because each frame can be analyzed to see thermal evolution and averaging may be performed as well as establishing a marginal boundary or window representing a minimum to maximum window, within which future user submissions may be compared against. The recorded thermal data would preferably be collected from a user within a certain range or physical orientation to the sensor, for example with the user standing within 2-5 feet of the sensor and not 30-50 feet from the sensor.

At step 305, the collected thermal data (images/video) may be processed with the aid of local SW to generate a mean or nominal thermal signature representing the mean values with respect to heat variances detected within the video. At step 306, the local system (consisting of local sensors, processor and SW) may be instructed to repeat the video process (steps 304 and 305)×number of times over a period of time. In this way, a more granular thermal record of the user may be compiled that indicates or at least accounts for normal heat variances that may occur because of time of day, health state of the user, sleep state of the user, and so on. The goal is to provide a dual-mode process that is more difficult to obfuscate using a stolen image or video or one recorded using another device not owned by the user. In other words, the system accounts for such fraudulent attempts as using an image that was taken from an unauthorized device or otherwise provided to fool the system into thinking that a nonauthorized user is indeed the authorized user.

At step 307, the user may store or submit for storage, the thermal signature. If stored locally it may be in an encrypted state for later upload with a decryption key to a site that will store the information on behalf of the user. In one aspect the thermal signature is not retained in a useable format on the smart phone of the user, but rather, uploaded to a website for identity recognition and authentication. For example, the user may be registering for a web service and is creating a user profile that includes name and image thermal signature data where in the data the user had recorded and submitted becomes the pass code instead of or in addition to a password or PIN. In other words the data, including the thermal signature data, can be equated into some sort of unique passcode In one aspect, a user may recapture or update by recording another face video such as at step 304, and if appropriate the older version of the user visible/thermal signature may be corrected with the new data or may be entirely replaced by the new data. The user may then update any remote location that currently has the user's visual/thermal signature available. The process ends for updating at step 309. In one aspect of the method, a user may be urged or required to repeat the collection and update the recorded data such as at different times of a year, for example once in winter and once in summer, contemplating possible differences in thermal data of the user due to different temperature environments where the imagery is recorded. Other user states may also be considered such as temperature differences between a healthy user and one who has the flu for example.

Figure 4:
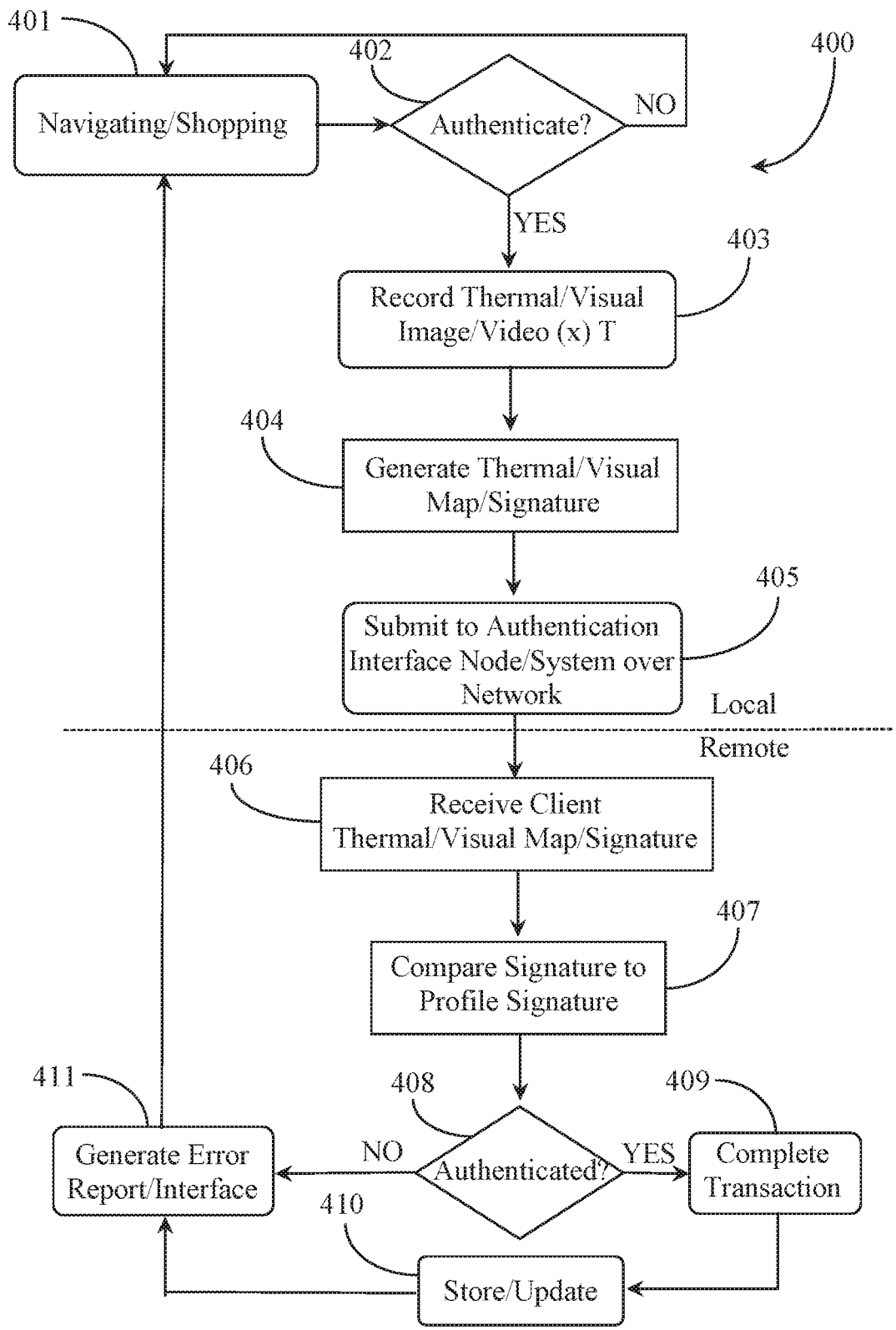
FIG. 4 is a process flow chart depicting steps for performing a dual-mode authentication over a network according to an embodiment of the invention.

FIG. 4 is a process flow chart depicting steps for performing a dual-mode authentication over a network according to an embodiment of the invention. At step 401, a user may be navigating a network, for example, an Internet network using his or her smart phone to shop online or to access known web sites the user is a member of or has authorization to interact with. In one embodiment, the user may instead be shopping in a retail establishment and interacting with an interface locally that has a network connection to an authentication server, such as an automated transaction network (ATM).

At step 402, the user may determine to authenticate or otherwise participate in an authentication procedure. If the user has decided not to log-in or conduct a transaction requiring authentication, the process may resolve back to step 401. If the user determines to participate in an identification and authentication procedure at step 402, then at step 403, the user may be required to record a combination of thermal and visual light (VL) images or video. If the user records thermal/VL video, a time T may be enforced for the length of the video recorded such as (x) T=3 seconds, for example. If still images but not a video are requested or otherwise required by rule, the process may be the same except for a record time requirement.

It may be noted herein that in one aspect of the process, the thermal data (video or image) may be first recorded followed by visible light spectrum data (video or snapshot) wherein the data from each may be combined or augmented to manufacture the signature that is held in the user's security profile data at the authentication service. Using present technology, the thermal and visible light data is collected by separate sensors which may or may not be contained within a single device. However to the extent that sensors capable of collecting both visible light and thermal data are developed, a single sensor may be used to detect both. Regardless, the thermal imaging and VL data may be recorded simultaneously or one after the other.

In one aspect of the process at step 403, the local access device such as the user's smart phone may collect and record one or more thermal images or thermal data of the user while the device is otherwise in a power-managed sleep mode. In such an embodiment, the thermal data may be taken in sequential steps or all at once. For example, a heat temperature of the user may be first detected and confirmed as human after which time a more robust thermal reading may be taken confirming relative thermal characteristics of the thermal image. Thermal data is generally taken all at once as a thermal body enters the range of the thermal sensor. A confirmation by the sensor of a thermal body entering within range of the system may then trigger the sensor to wake up to a second power level and record a more detailed thermal reading (for example a thermal video) of the user's face, followed by triggering the visible light sensor to boot back up to full power to take the visible light imagery, which may also require typical lighting mode and resolution (focus) calculations. Such power-saving features are provided in detail later in this specification.

It should also be noted that confirmation of a subject as human may be a single reading of temperature to determine whether the temperature reading is within the range which is consistent with the temperature of a human (and not some other animal or object such as a hot cup of tea held in front of the sensor). The human skin temperature is fairly consistent, 34-36 degrees Celsius with ambient temperature of between 20-34 C. In some embodiments, the temperature confirmation may be more robust in that a temperature map is taken to determine whether the relative temperatures at various locations on the subject is consistent with the relative temperature readings which would be expected for a human face (although such robust temperature imaging will require more power consumption than a single temperature reading). If the person/object is outside the expected or target range, the visual sensor will not be triggered. This helps to conserve power consumption in both powering up the visual sensor and possibly LED to light up the person of interest. For instance if a hot object like a cup of hot tea is held in front of the sensors and it is not within the expected/target range for a human (i.e. between 30-42 degrees C.), the visual sensor will not be triggered.

In step 404, the local access device aided by the SW may generate (on board) a—non-compressed thermal/visual map or signature from the recorded video data of the thermal region around the user's face and the visible light spectrum video of the user's face. A bitmap, for example, created on the user's device will be a current representation of a bitmap held on file so both bitmaps describe the exact same data points taken from the thermal/VL data. Alternatively, the data can be compressed or otherwise processed locally or at the server prior to being matched.

At the authentication site, the data may be compared to the user's data on file as security data for match. There may be a range of variation that might be accepted in matching the current data to the data on file. Such range would be known to a person skilled in the art and would depend, in part, on the sensitivity and accuracy of the sensor and potentially the ambient temperatures at the point of detection and/or the amount of time that has transpired since the recorded data had been updated (in other words, more leeway may be given when there has been a longer time period from the date of the latest update). At step 405, the user may send the thermal/VL signature to an authentication interface node or system over the network. It may be assumed that all the sites the user is a member of (log-in) and the sites confirming user authenticity have a visual/thermal signature of that user on file for comparison. In other words, the sites attempting to authenticate the user already have visual/thermal information about the user in which to compare and authenticate the incoming data from the user.

Online at step 406, the remote interface may receive the uploaded thermal/visual map or signature. This might be during performance of a transaction or during a log-in attempt. At step 407, the server aided by SW compares the received signature with the signature the client has on file. At step 408 the system (SW) determines whether the user is authenticated or not. If the user is not authenticated at step 408, the process may skip to step 411 whereas the server may generate an error report and submit that report back to the user (phone) or interface (terminal) the user is working through.

If the system identifies and authenticates the user at step 408, then the process may move to step 409 where the user may complete a transaction or log-in procedure or otherwise be granted access. At step 410, the system may update existing data with any new data detected in the latest collected data image or signature. In this case, the system generates a report of success and submits it to the user or local interface at step 411. The user may continue in this manner until a session is purposely or unintentionally terminated by the user.

In one embodiment, the smart phone contains a comprehensive list of all the secure sites that the user frequents or shops at or is a member of. In this case, when a user records new thermal data, the new data may automatically be pushed to the listed sites for comparison and possible correction of their databases. In one embodiment, the method and apparatus of the present invention may be used in addition to other authentication procedures. In one embodiment, the method and apparatus of the invention includes a sensor for detecting a biometric vital sign such as a heartbeat; however that is not required as thermal video may also reveal the health or "alive" state of the individual which may be relevant to whether or not to provide access or authentication. In still other embodiments thermal video may be analyzed for breathing signatures (such as a temperature range of the air entering and exiting the data subjects mouth or nostrils during breathing in and breathing out within a cycle of normal breathing), augmented with recorded voice from the user (adding voice signature) and so on.

In one implementation, a user may authenticate to a local system such as a security door and alarm system of a home that requires the user to authenticate to the system before the system grants the user access to a home or a business, for example. In another implementation, the collected data of the user (in this case the subject thermal body) is processed locally, sent over network by the system and compared with stored data at a remote server. In some implementations, the collected data is compared locally with stored data that indicates whether the subject body is human or alive. In some implementations, specific identify of the subject is confirmed either locally or remotely.

Figure 5:
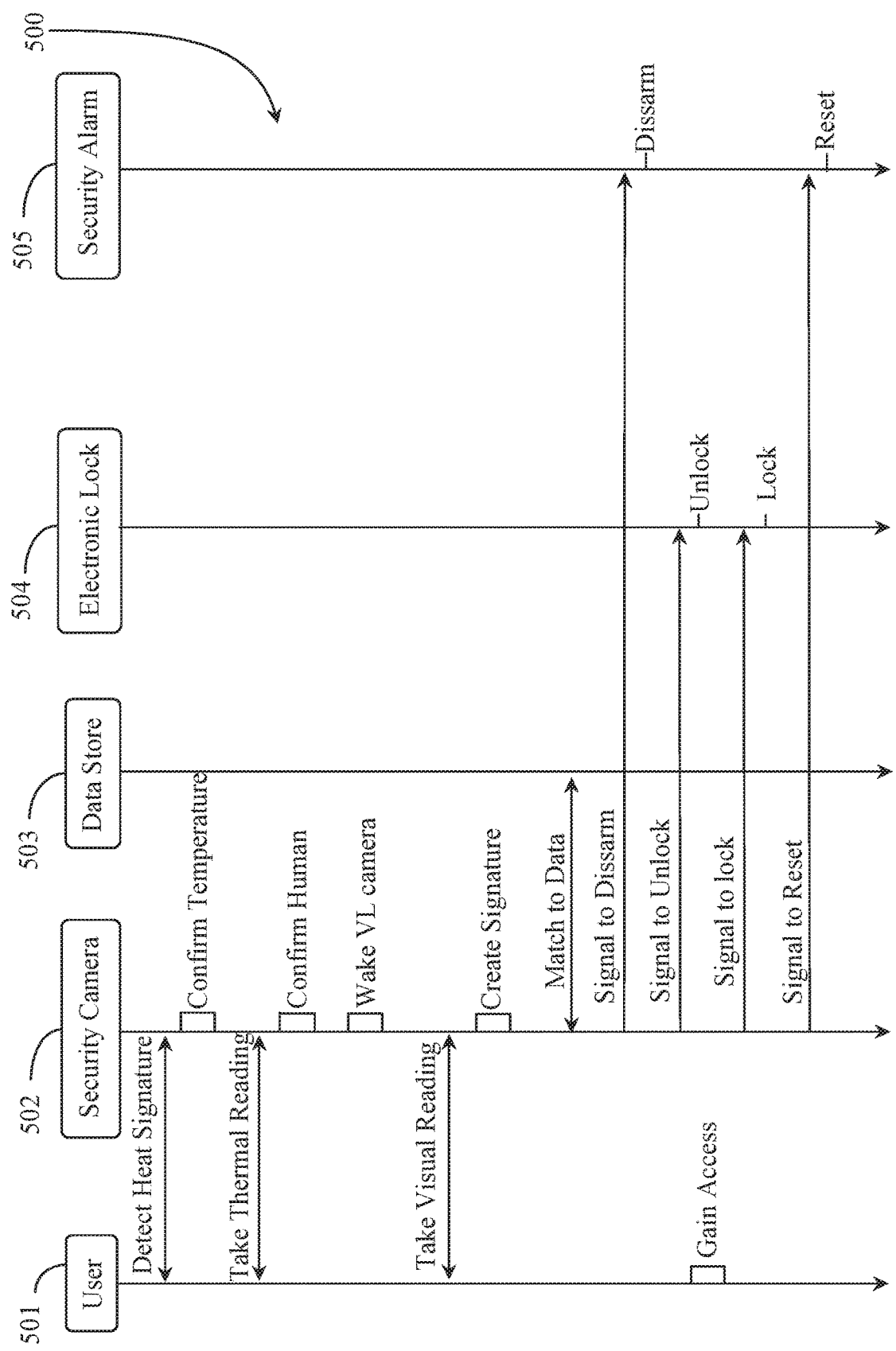
FIG. 5 is a sequence diagram showing components of a door security system and depicting interaction between components according to task sequence in one embodiment of the present invention.

FIG. 5 is a sequence diagram 500 depicting components of a door security system depicting interaction between components according to task sequence in one embodiment of the present invention. Diagram 500 depicts person or otherwise heat emitting thermal body such as a non-human animal 501 representing a subject to identify and/or authenticate. The security system includes a security camera device 502 including a thermal sensor, a data storage (data store) 503, a processor 504, and software 505 stored in memory which may be located on-board the security camera device or on a separate but connected computerized device such as a remote computer or server. The security system may control or automatically operate external devices in a wired or wireless manner, such devices including electronically controlled lock or locks, lights, sounds emitting devices, security alarm signaling device, together 506. For example, the security system may include a security alarm that is connected by wire or wireless connection to all the locked entry points into to the home such as other doors, windows, etc.

Security camera 502 may be mounted in stationary position, for example on a security door facing outward toward persons who might access the door. Security camera 502 may typically reside in a power-managed sleep mode such that a trigger event must occur before the camera powers up completely. There may be one or more than one reduced power level for security camera 502 without departing from the spirit and scope of the invention. The thermal sensor is operational in lower level power mode(s), such as in a power-managed sleep mode, than a level of power that would be required to operate a visible light sensor or camera.

When a thermal body or object (human or animal) 501 approaches security camera 502, the camera may be in sleep mode (low power consumption). As the thermal body reaches an area in front of the camera defined as the operational range of the camera (for example within 5-10 meters in front of the camera), the security camera 502 may detect the presence of the thermal body while in sleep mode using a low power thermal sensor. Such thermal sensor may stay on and in a low power mode while visible light sensor is in sleep mode or powered off. As the thermal body reaches the operational range of the security camera 502 the thermal sensor detects thermal temperature of the thermal body within a thermal range indicating the presence of a person or target body (such as an animal or some other non-human body). In some embodiments, the thermal reading includes thermal data sufficient to establish a thermal signature of the body such to determine size, facial features, biometric state etc. For example, as the body approaches the thermal signature may help determine whether the thermal body is human and facing the camera while the camera is still in low power sleep mode.

Security camera 502 may analyze the collected thermal data or heat signature to determine whether the thermal body is consistent with a human or other target thermal object. In some embodiments, the collected thermal data could indicate the occurrence of an event other than the approach of a human or live thermal body such as the approach of a motorized vehicle, fire, or thermally propelled object. Security camera 502 may ignore the thermal reading if the target thermal body data or signature is not consistent with a certain expectation or purpose, if it is not have the thermal characteristics of human, for example, in height, shape, location of physical characteristics (eyes, nose, mouth) relative to one another. If, for example, the thermal data is consistent with a human thermal reading, the system may power on a visible light sensor (camera) from sleep mode or dormant state (OFF). If, for example, the thermal data is consistent with some other non-human thermal body then a separate external device may be trigger such sound, alarm or other flood light. In some embodiments, the system may choose not to power up lighting but rather send some other type of signal. To identify the thermal body visually, the security camera may then power up a visual light (VL) sensor and take a VL image. Security camera 502 may be adapted to record and or send the thermal and visual images (data) through a network to a remote computerized device or may locally process the thermal and/or visual data to create a signature which is then recorded and/or sent via network to such remote computerized device. The data or signature is then compared to stored data or signature. In one embodiment the comparison may be done locally with locally stored authentication data. In another embodiment, the comparison is done at a remote server.

In one embodiment, for example, security camera 502 may compare the created signature with the signature on file and identify the thermal body as an authorized individual to enter through a locked door of a home or business. In granting access to the user, security camera 502 may first send a signal to disarm an alarm system 505 (if applicable) so an electronic lock 504 may be unlocked without tripping an alarm. In such case, upon receiving the signal, the alarm disables temporarily. Security camera 502 sends a signal to unlock electronic lock 504. The door lock 504 unlocks. At this point the person may enter (gain access) through the unlocked door.

Figure 6:
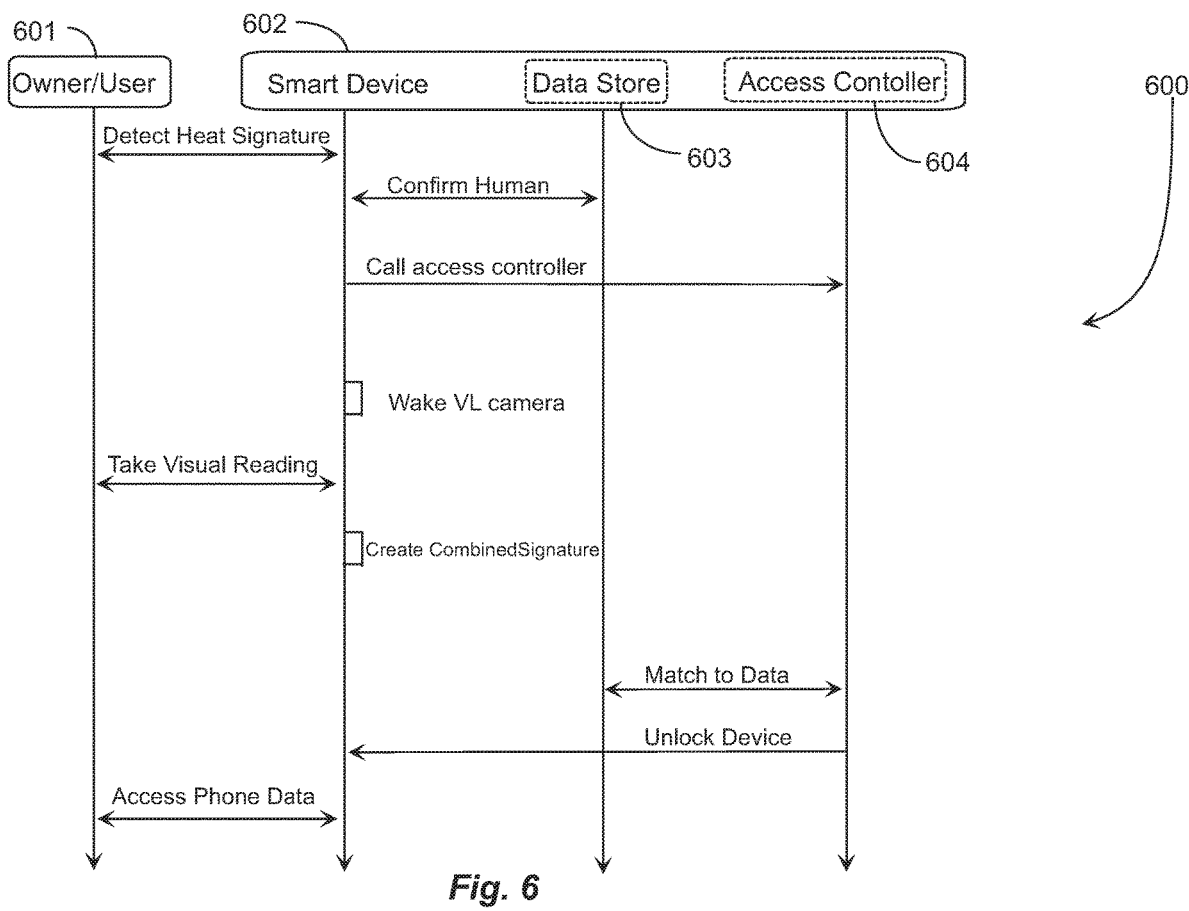
FIG. 6 is a sequence diagram depicting a user and components on a smart device and interaction sequence between components according to another embodiment of the present invention.

FIG. 6 is a sequence diagram 600 depicting a user and components on a smart device and interaction sequence between components according to another embodiment of the present invention. Sequence diagram 600 involves a user 601 who may be an owner or otherwise an authorized user of a smart device 602. For example, user 601 may be the owner of smart device 602. Smart device 602 may be a smart phone, for example, having a digital access lockout mode. Smart device 602 may access an on-board data store 603 (secure data storage). Smart device 602 has an access controller 604 that may grant or prevent access to the smart device 602.

In this sequence, user 601 may present in front of smart device 602 such that a thermal sensor operating during device power-managed sleep mode may detect a thermal signature from the user forming a thermal image. The thermal sensor may measure the temperature of the user and may check or confirm the reading by comparing it with information in data store 603. If the temperature range within the thermal image is confirmed as human, for example between 35 and 39 degrees Celsius with 37 degrees Celsius being nominal, device 602, and/or the thermal image is determined to be consistent with a thermal image showing stored facial regions of the user mentioned in this specification, including mouth, nose, and or eye regions, the access controller 604 wakes the camera 602 out of sleep mode and powers up a visual light camera or sensor. One should note that the temperature readings may be accomplished using a lower power state than might be required for full visual imaging function and for operating the device to multitask. The power savings results from not powering up the device to take visual readings or to multitask until there is confirmation that the data subject (user) is human.

In one embodiment, the access controller may wake up a visible light (VL) camera at the next power level to support the VL camera. The VL camera may then take a visual reading such as a snapshot of the user's face. The device may create a combined thermal and visual data signature. Device 602 may call access controller 604 (identification/authentication) and use the created combined thermal and visual data signature as an access signature to gain access to device data and other functions. Access controller 604 may compare the created signature to one on file in data store 603. If it matches the data on file, the access controller may digitally unlock the device and the user may have access to the device data.

Figure 7:
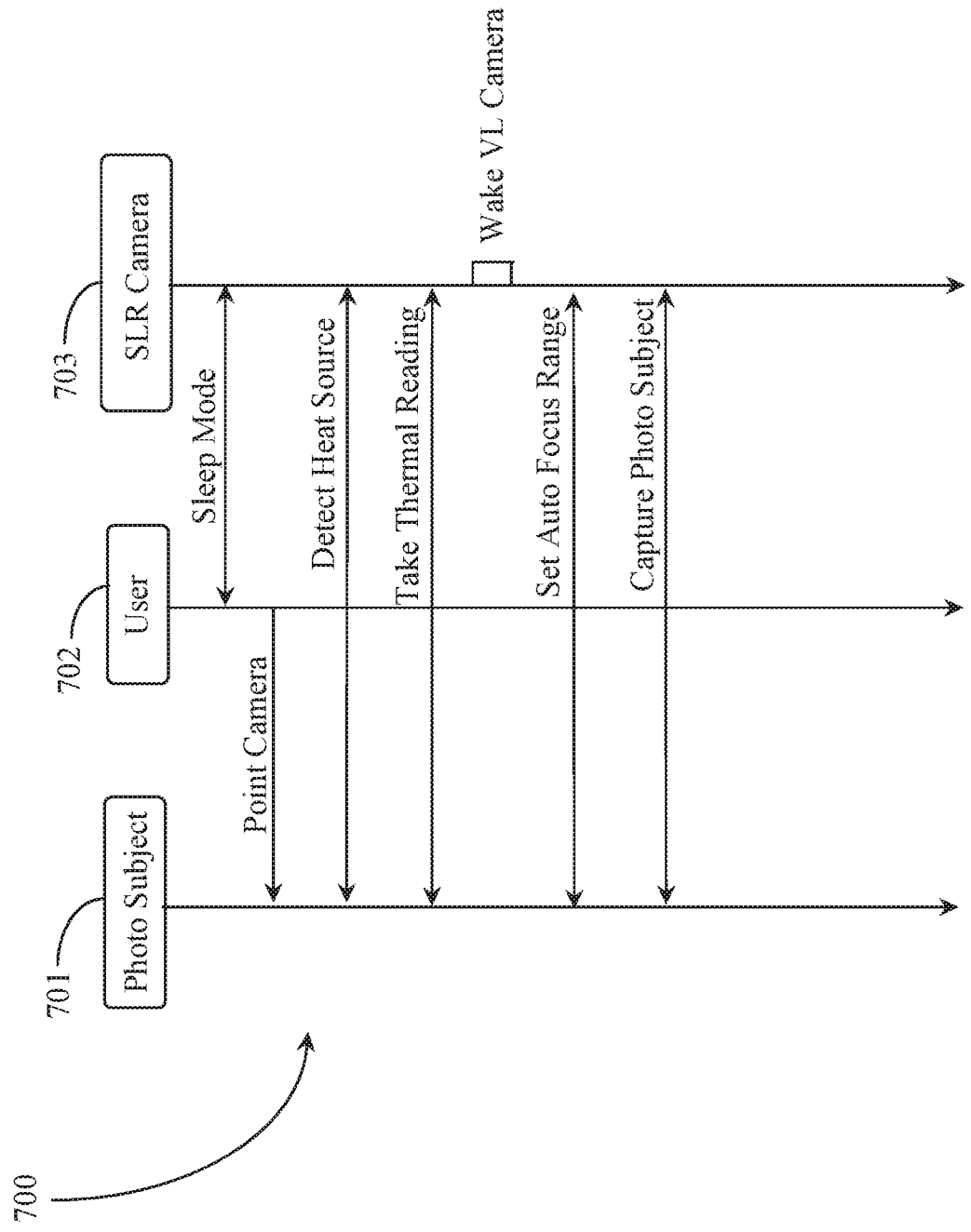
FIG. 7 is a sequence diagram depicting a photography subject, a photo taker, and a single-lens reflex (SLR) camera and depicting an interaction sequence on the SLR camera for capturing an image or video of the photo subject.

FIG. 7 is a sequence diagram 700 depicting a photography subject, a user, and a single-lens reflex (SLR) camera and depicting an interaction sequence on the SLR camera for capturing an image or video of the photo subject. In some embodiments of the invention, the SLR camera is replaced by a visible light sensor or camera connected with a network (such as an Internet of Things device that does not have a focusing lens). A user 702 may want to take a photograph during low light conditions using SLR camera 703. SLR camera may be in a sleep mode but running a thermal sensor capable of detecting a heat signature of a photo subject 701. User may point the camera face (sensor) toward the intended photo subject 701. The photo subject could be of one or more people, or of one person, etc. The camera is calibrated to have a predetermined operational range. In other words, there is a determination that a photo would be taken of a photo subject once it enters within a certain predetermined range of the camera. In low light conditions, the camera may have difficulty determining by visual light or other means whether the object is within a certain range particularly in low power mode. For example, a user may want to have the camera in low power mode and only power up the camera to take a photo once a thermal body (human photo subject or some other thermal body) is within a predetermined range of the camera. In another example, the user may want the camera to power up to determine a photo exposure setting only once there is a determination that there is a photo subject within the predetermined operational range or a specific range within that predetermined operational range. In some examples of use, the user may be interested in not only determining the existence of the photo subject within a operational range but the physical characteristic or orientation of the photo subject within that range. In other words, the user may be interested in taking a photo in low light conditions of a photo subject that is within 2-5 feet of the camera and facing the lens.

SLR camera 703 may detect a heat source emanating from the subject or subjects to be photographed as they come within the predetermined operational range. The thermal sensor may determine that the thermal body is within the range and take a thermal signature or image that can be analyzed to determine whether the thermal body is within a more specific range and/or has a certain orientation towards the camera. All of this is done in low power mode by the thermal sensor. The thermal reading may include range data including at least range data that might not be correctly gathered by a visible camera in low light conditions. Having the thermal data, the SLR camera moves out of low power mode to enable a visible light photo or image to be taken. In some embodiments, the thermal data is utilized by the camera to determine focus, exposure setting and/or orientation of the photo subject to the camera lens. For example, the thermal data may be utilized to determine that a photo will be taken at a certain exposure setting once the photo subject are looking at the camera In such case, the facial orientation of the photo subjects may be determined by analysis of the thermal data. The range may be provided to the VL sensor to help set auto focus in the low ambient lighting. In other words, the visual light sensor is powered up to focus the lens. The camera may capture a photo of the subject(s), the camera powering an LED to illuminate the subjects. In some embodiments, the camera utilizes the available light without illumination by adjusting the exposure settings accordingly.

In one embodiment of the present invention the thermal sensor detecting a first heat signature and the thermal sensor taking a facial region photo are combined into a single sensor and processing circuitry that may operate at a power state lower than a power state for full VL camera operation. In one embodiment, the sensors for thermal recording tasks and those for visual recording tasks are physically integrated but operational as a dual-mode sensor (taking thermal or VL readings). In one embodiment, a single mode or combined mode may be enabled wherein the camera or smart device may take an image or video with both thermal and VL data included and viewable on a display.

It would be apparent to a person skilled in the art that the use of a thermal sensor to wake a camera out of low power (or sleep mode) to take a visual image or photograph is not only power saving but an advantage over using a motion sensor commonly used in certain security camera systems to detect the presence of a photo subject. The thermal sensor uses less energy than motion sensor. Also, use of thermal sensor reduces instances of erroneous detection caused by other environmental factors that do not include a presence of a thermal body. For example, it is common for motion sensors to trigger from wind or movement caused by factors other than those indicating the presence of a person or intruder. Thermal data can allow the system to determine the difference between the presence of a small animal (mouse or cat) as opposed to a human. The thermal data can also be utilized to authenticate in low power mode. For example, a security camera system utilizing the invention described can be calibrated to power up the visual light sensor or camera only in instances where the thermal data signature matches or does not match certain stored authentication data. The data may again be stored locally or on a remove server, the system taking a photo or otherwise triggering external device or devices such as external lights or alarms or wireless messaging to third parties when there is a detection of thermal data that is not consistent with data showing presence of an authorized person.

It may also be appreciated that the use of thermal data to determine the existence of a person or thermal subject within range can be utilized by the invention to simply trigger lights or other external devices. In such examples, the thermal sensor takes the place of a motion sensor in triggering lights or operation of other external devices when a subject thermal body is within range. The advantages are many but include lower power usage, diminished false positives, and the ability to distinguish at low power usage the differences between persons and animals, authorized or nonauthorized persons, or other factors not distinguishable using motion sensors.

It will be apparent to one with skill in the art that the dual-mode identification and authentication system of the invention may be provided using some or all the mentioned features and components without departing from the spirit and scope of the present invention. It will also be apparent to the skilled artisan that the embodiments described above are specific examples of a single broader invention that may have greater scope than any of the singular descriptions taught. There may be many numerous alternatives in the specific descriptions provided without departing from the spirit and scope of the present invention.

The invention claimed is:

1. A Security system, comprising:
a processor;
a thermal image sensor connected to the processor; and
one or more devices enabled to communicate with the processor;
wherein with the security system in a low power sleep mode, the thermal sensor detects and collects data from a thermal body and the processor determines if it matches predefined parameters for a thermal body and the processor wakes the system from the low power sleep mode and activates any one or more first external devices based on the match;
wherein the one or more first external devices is a visual light camera connected to the processor, the visual light camera enabled to capture visual image data;
wherein the thermal data is within a predefined thermal range consistent with a person, an image is captured by the visual light camera and the visual image data is sent to a data store with the thermal data, the data store accessible by the processor enabled to authenticate an identity of the person; and
wherein image profiles are associated with specific identities and stored in the data store, and the thermal data and image data are integrated and used to match to one of the image profiles thereby making an identification.

2. The security system of claim 1, wherein upon making the identification, the processor causes a second device to activate.

3. The security system of claim 2, wherein the second device is a lock device.

4. The security system of claim 1, wherein a computerized device connected to the processor and data store, executes software to process the thermal and visual image data, match the processed data to one of the stored image profiles, and makes the identification.

5. A method for implementing a security system in a low power sleep mode, comprising the steps of:
positioning the system having a predetermined operational range and in a state of low power sleep mode;
connecting a processor and data store to a thermal image sensor; detecting and collecting thermal data from a thermal object body in the determined operational range;
determining by the thermal sensor, if the thermal data matches predefined parameters for a thermal body; and
if the determination is that the thermal data matches predefined parameters, the system wakes from the low power sleep mode and activates one or more first devices enabled to communicate with the processor;
wherein the one or more first devices is a visual light camera connected to the processor, the visual light camera activated and enabled to capture image data;
wherein when the thermal data is within a predefined thermal range consistent with a person, an image is captured by the visual light camera and the visual image data is sent to the data store with the thermal data, the data store accessible by the processor, enabled to authenticate an identity of the person; and
wherein image profiles are associated with specific identities and stored in the data store, and the thermal data and image data are integrated and used to match to one of the image profiles, thereby making an identification.

6. The method of claim 5, wherein upon making the identification, the processor causes a second device to activate.

7. The method of claim 6, wherein the second device is a lock device.

8. The security system of claim 5, wherein a computerized device connected to the processor and data store, executes software to process the thermal and visual image data, match the processed data to one of the stored image profiles, and makes the identification.

* * * * *